United States Patent
Silvers et al.

(10) Patent No.: US 9,470,128 B2
(45) Date of Patent: Oct. 18, 2016

(54) EXHAUST SYSTEM IMPLEMENTING ACTIVE REGENERATION CONTROL

(71) Applicant: Electro-Motive Diesel, Inc., Lagrange, IL (US)

(72) Inventors: Brad Silvers, Plainfield, IL (US); Michael B. Goetzke, Orland Park, IL (US); Reddy Pocha Siva Sankara, Lisle, IL (US)

(73) Assignee: Electro-Motive Diesel, Inc., La Grange, IL (US)

( * ) Notice: Subject to any disclaimer, the term of this patent is extended or adjusted under 35 U.S.C. 154(b) by 89 days.

(21) Appl. No.: 13/903,514

(22) Filed: May 28, 2013

(65) Prior Publication Data

US 2014/0352277 A1    Dec. 4, 2014

(51) Int. Cl.
*F01N 3/18*     (2006.01)
*F01N 3/027*    (2006.01)
*F01N 9/00*     (2006.01)
*F02D 41/02*    (2006.01)

(52) U.S. Cl.
CPC ............... *F01N 3/027* (2013.01); *F01N 9/002* (2013.01); *F02D 41/024* (2013.01); *F01N 2560/08* (2013.01); *F01N 2900/1406* (2013.01); *F02D 41/029* (2013.01); *Y02T 10/26* (2013.01); *Y02T 10/47* (2013.01)

(58) Field of Classification Search
USPC .................. 60/274, 286, 295, 297, 303, 311
See application file for complete search history.

(56) References Cited

U.S. PATENT DOCUMENTS

| | | | |
|---|---|---|---|
| 6,865,883 B2 * | 3/2005 | Gomulka | ........................ 60/295 |
| 2006/0168952 A1 * | 8/2006 | Opris | .............................. 60/297 |
| 2011/0061364 A1 * | 3/2011 | Raman | ............................ 60/274 |
| 2012/0003131 A1 | 1/2012 | Ibrahim et al. | |
| 2012/0291895 A1 | 11/2012 | Wagner et al. | |

FOREIGN PATENT DOCUMENTS

| | | |
|---|---|---|
| WO | WO 83/00723 | 3/1983 |
| WO | WO 2011/119331 | 9/2011 |

* cited by examiner

*Primary Examiner* — Thomas Denion
*Assistant Examiner* — Brandon Lee
(74) *Attorney, Agent, or Firm* — Finnegan, Henderson, Farabow, Garrett & Dunner, LLP

(57) ABSTRACT

An exhaust system is disclosed for use with an engine. The exhaust system may have an exhaust duct, an aftertreatment component disposed within the exhaust duct, and a resistive grid disposed within the exhaust duct at a location upstream of the aftertreatment component. The exhaust system may further have a controller configured to determine a need to heat the aftertreatment component to a threshold temperature, determine a load increase that should be placed on the engine to raise a temperature of exhaust exiting the engine when the aftertreatment component needs to be heated, and determine an amount of electrical power that should be applied to the resistive grid to raise the temperature of the exhaust. The controller may also be configured to selectively implement a combination of engine load increase and application of electrical power to the resistive grid to raise the temperature of exhaust to the threshold temperature.

20 Claims, 1 Drawing Sheet

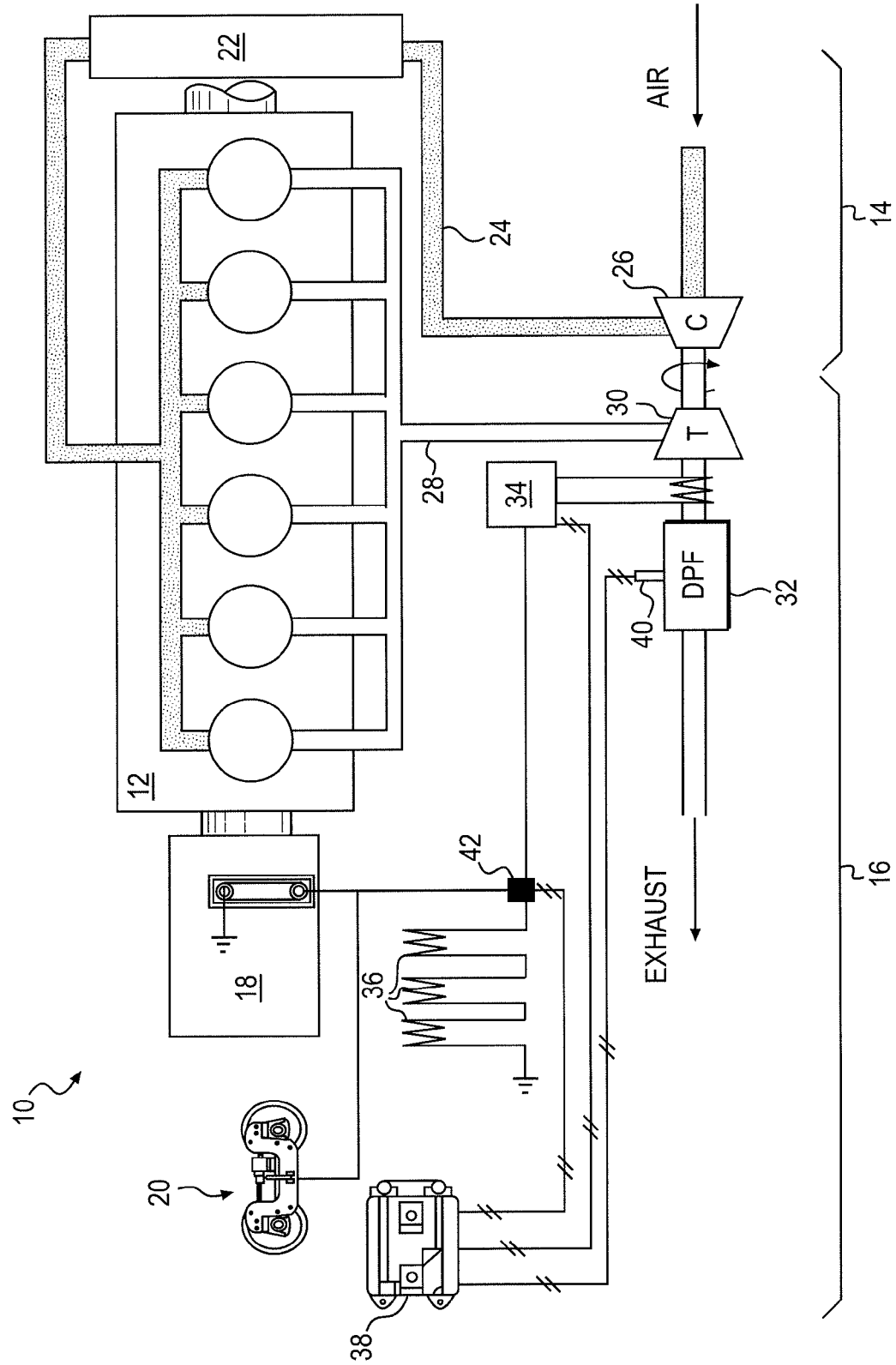

EXHAUST SYSTEM IMPLEMENTING ACTIVE REGENERATION CONTROL

TECHNICAL FIELD

The present disclosure is directed to an exhaust system and, more particularly, to an exhaust system that implements active regeneration control.

BACKGROUND

Engines, including diesel engines, gasoline engines, gaseous fuel powered engines, and other engines known in the art exhaust a complex mixture of air pollutants. These air pollutants can include gaseous compounds, such as the oxides of nitrogen, and solid material known as particulate matter or soot. Due to increased attention on the environment, exhaust emission standards have become more stringent and the amount of gaseous compounds and solid material emitted from an engine is regulated depending on the type of engine, size of engine, and/or class of engine.

One method implemented by engine manufacturers to comply with the regulation of pollutants exhausted to the environment has been to reduce, convert, or otherwise remove the gaseous compounds and particulate matter from the exhaust flow of an engine with catalysts and filters. These devices, however, may only function efficiently under particular operating conditions. For example, some catalysts function efficiently only when exposed to elevated temperatures. Particulate filters function for only a period of time, until they become saturated with soot. In order for the particulate filters to continue operation, they may need to be heated above a combustion threshold of the trapped particulate matter such that the particulate matter is burned away. Accordingly, some engine exhaust systems are equipped with means for artificially raising a temperature of the exhaust passing through the catalysts and filters, such that use of these devices can be improved and maintained.

An exemplary exhaust system that artificially raises the temperature of exhaust passing through a filter is disclosed in U.S. Patent Publication 2012/0003131 of Ibrahim et al. that published on Jan. 5, 2012 ("the '131 publication"). Specifically, the '131 patent discloses an electric power system having a diesel engine connected to drive a generator via a mechanical coupling. The generator, in turn, produces electric power used to propel a locomotive. An electric load bank is used to dissipate excess power produced by the locomotive during braking. An electric heater is provided and includes resistive elements located within an exhaust flow of the engine. The electric heater is used to raise a temperature of exhaust from the diesel engine up to about 1000° F., at which soot trapped in an exhaust particulate trap is oxidized. An external power source, the generator, and/or the excess power produced during braking is used to power the electric heater.

Although the system of the '131 publication may adequately function to regenerate an exhaust particular trap, it may still be less than optimal. Specifically, the system may not consider important operating conditions of the diesel engine during regeneration that could improve an efficiency of the regeneration process. In addition, the electric heater, by itself, may be insufficient to adequately oxidize the trapped particulate matter.

The disclosed system and method address one or more of the problems discussed above and/or other problems of the prior art.

SUMMARY

One aspect of the present disclosure is directed to an exhaust system. The exhaust system may include an exhaust duct configured to direct exhaust from the engine to the atmosphere, an aftertreatment component disposed within the exhaust duct, and a resistive grid disposed within the exhaust duct at a location upstream of the aftertreatment component. The exhaust system may further include a controller configured to determine a need to heat the aftertreatment component to a threshold temperature, determine a load increase that should be placed on the engine to raise a temperature of exhaust exiting the engine when the aftertreatment component needs to be heated, and determine an amount of electrical power that should be applied to the resistive grid to raise the temperature of the exhaust. The controller may also be configured to selectively implement a combination of engine load increase and application of electrical power to the resistive grid to raise the temperature of exhaust to the threshold temperature.

Another aspect of the present disclosure is directed to a method of handling exhaust from an engine. The method may include determining a need to heat an aftertreatment component to a threshold temperature, determining a load increase that should be placed on the engine to raise a temperature of exhaust exiting the engine when the aftertreatment component needs to be heated, and determining an amount of electrical power that should be applied to a resistive grid in a flow path of the exhaust to raise the temperature of the exhaust. The method may further include selectively implementing a combination of engine load increase and application of electrical power to the resistive grid to raise the temperature of exhaust to the threshold temperature.

BRIEF DESCRIPTION OF THE DRAWINGS

FIG. 1 is a schematic and diagrammatic illustration of an exemplary disclosed power unit.

DETAILED DESCRIPTION

FIG. 1 illustrates an exemplary power unit 10 that may be used in a mobile application (e.g., the prime mover of a locomotive) or a stationary application (e.g., as the power source of a utility station). For the purposes of this disclosure, power unit 10 is depicted and described as including an internal combustion engine 12, an air induction system 14, and an exhaust system 16. Air induction system 14 may be configured to direct compressed air or a mixture of air and fuel into engine 12. Engine 12 may combust the air and fuel to generate a mechanical output and a flow of exhaust gases. Exhaust system 16 may be configured to direct the flow of exhaust gases from engine 12 to the atmosphere. One skilled in the art will recognize that power unit 10 may include any type of internal combustion engine, such as a two- or four-stroke diesel fueled, gasoline fueled, gaseous fueled, or blended fueled engine.

Engine 12 may be connected to a mechanical load that is configured to convert a rotational output from engine 12 to useful power. In the disclosed embodiment, engine 12 is connected to a primary generator 18 that converts the rotational output to electrical power, which can then be directed to an electrical component corresponding with the particular application of power unit 10. In the mobile application example, the electrical power can be directed to one or more traction motors 20 that propel the locomotive.

In the stationary application example, the electrical power can be directed to end consumers (e.g., via a utility grid) or used on site for other purposes (e.g., for pumping and/or drilling purposes). It is contemplated that the mechanical load that receives the rotational output from engine 12 could embody a device other than a primary generator, if desired.

Air induction system 14 may include multiple components that cooperate to condition and introduce compressed air or a mixture of compressed air and fuel into engine 12. For example, air induction system 14 may include an air cooler 22 located within an inlet duct 24 downstream of one or more compressors 26. Compressor(s) 26 may be configured to draw in air, pressurize the air, and direct the air through cooler 22 into engine 12 via inlet duct 24. As the air passes through cooler 22, cooler 22 may dissipate heat from the air to the atmosphere, thereby reducing a temperature and increasing a density of the air.

Exhaust system 16 may include multiple components that condition and direct exhaust from engine 12 to the atmosphere. For example, exhaust system 16 may include an exhaust duct 28, one or more turbines 30 driven by exhaust flowing through duct 28, and one or more aftertreatment components 32 fluidly connected downstream of turbine(s) 30. Exhaust from engine 12 may be directed to pass through turbine(s) 30 and thereby drive turbine(s) 30 to rotate compressor(s) 26 and compress inlet air. After exiting turbine(s) 30, the flow of exhaust may pass through aftertreatment component(s) 32 and be conditioned prior to discharge to the atmosphere.

Aftertreatment component(s) 32 may include any one or more of an oxidation catalyst (e.g., a diesel oxidation catalyst—DOC), a particulate filter (e.g., a diesel particulate filter—DPF), a reduction catalyst (e.g., a selective catalytic reduction device—SCR device), a cleanup catalyst (e.g., an ammonia adsorbing catalyst—AMOx catalyst), or another type of component known in the art that is used to convert, reduce, trap, remove, or otherwise condition constituents of the exhaust produced by engine 12. For exemplary purposes only, exhaust system 16 is shown in FIG. 1 as having a single DPF that is configured to remove particulates (e.g., soot and unburned hydrocarbons) from the exhaust passing through duct 28.

After treatment component(s) 32 may be configured to operate optimally when exposed (at least periodically) to exhaust temperatures at or above a threshold value. For example, a particular catalyst may only convert or reduce constituents at a desired rate when the exhaust temperature is elevated. In another example, a DPF may become saturated with soot over a period of time and require periodic exposure to higher exhaust temperatures for regeneration purposes. That is, the soot collected with the DPF may only be removed through oxidation, which occurs at temperatures elevated above a light-off temperature of the soot.

The temperature of exhaust passing through aftertreatment component(s) 32 may be elevated in several different ways. First, the mechanical load on engine 12 may be selectively increased, thereby causing engine 12 to combust a greater amount of fuel and increasing a resulting temperature of the exhaust passing through duct 28. The mechanical load on engine 12 can be increased by adjusting the operation of primary generator 18, such that primary generator 18 converts a greater amount of the mechanical rotation of engine 12 to electrical power. Second, a heater (e.g., an electrical resistive grid disposed within duct 28) 34 may be used to directly heat the exhaust at a location upstream of aftertreatment component(s) 32 and downstream of turbine(s) 30.

When increasing the mechanical load on engine 12 so as to artificially increase exhaust temperatures, the extra electrical power produced by primary generator 18 must be accommodated. That is, the extra electrical power must be drawn away from primary generator 18. In one embodiment, the extra electrical power can be dissipated through a series of resistive grids 36 that transfer the electrical power to the atmosphere in the form of heat. In another embodiment, the extra electrical power can be directed to heater 34 and used to further increase exhaust temperatures. In yet another embodiment, some of the extra electrical power can be directed to resistive grids 36 and the remaining extra electrical power can be directed to heater 34.

When using heater 34 (alone or in conjunction with an increase in mechanical load) to artificially increase exhaust temperatures, the electrical power provided to heater 34 may come from a variety of different sources. As described above, in one embodiment, the electrical power can come directly from primary generator 18. In another embodiment, the electrical power can be generated by traction motors 20 during a braking event, as is known in the art. In yet another embodiment, the electrical power directed to heater 34 can come from a power storage source, such as a battery. In a final embodiment, the electric power can be provided from a combination of these different sources, as desired.

The temperature of the exhaust flowing through aftertreatment component(s) 32 may be selectively increased based on any number of different conditions. For example, the exhaust temperatures can be selectively increased any time additional electrical power is available, such as any time a braking event occurs. Alternatively, the exhaust temperatures may be selectively increased on a periodic basis or whenever aftertreatment component(s) 32 require or would benefit from the increase in temperature.

In the disclosed embodiment, a controller 38 regulates the exhaust temperatures based on a parameter of aftertreatment component(s) 32 that is detected via one or more sensors 40. For example, based on a detected pressure or pressure differential of exhaust passing through aftertreatment component 32, controller 38 may selectively cause the mechanical load on engine 12 to increase and/or cause electrical power to be directed to heater 34. Controller 38 may continue causing the increased load and/or activation of heater 34 for a set period of time or until the detected parameter of aftertreatment component(s) 32 reaches an acceptable value. Controller 38 may be configured to regulate the flow of electrical power between the different components of power unit 10, for example between primary generator 18, traction motors 20, heater 34, and/or resistive grids 36 via one more switches 42 or other solid state devices.

Controller 38 may embody a single or multiple microprocessors, field programmable gate arrays (FPGAs), digital signal processors (DSPs), etc., that are capable of controlling operations of power unit 10 in response to various input. Numerous commercially available microprocessors can be configured to perform the functions of controller 38. It should be appreciated that controller 38 could readily embody a microprocessor separate from those that control non-exhaust related functions, and that controller 38 may communicate with a general power unit processor via datalinks or other methods. Various other known circuits may be associated with controller 38, including power supply circuitry, signal-conditioning circuitry, actuator driver circuitry (i.e., circuitry powering solenoids, motors, or piezo actuators), communication circuitry, and other appropriate circuitry.

INDUSTRIAL APPLICABILITY

The exhaust system of the present disclosure may be applicable to a variety of engines including, for example, diesel, gasoline, and gaseous fuel-powered engines. In fact, the disclosed exhaust system may be implemented into any new or existing engine having aftertreatment components that benefit from selective exhaust heating. Operation of power unit 10 will now be described in detail.

During operation of power unit 10, compressor(s) 26 may draw in air, compress the air to a desired level, and direct the compressed air through cooler 22 into engine 12. Engine 12 may combust a mixture of the compressed air and fuel, generating the mechanical rotation that drives primary generator 18 and a flow of exhaust gases. The exhaust gases may pass through duct 28, driving turbine(s) 30, and then through aftertreatment component(s) 32. The exhaust gases may contain regulated constituents (e.g., particulates), which should be conditioned (e.g., trapped) by aftertreatment component(s) 32.

Controller 38 may monitor operation of aftertreatment component(s) 32 and responsively determine a need to increase the temperature of exhaust passing therethrough. For example, based on a pressure differential signal from sensor(s) 40, controller 38 may determine that the DPF is saturated with soot and needs to be regenerated. Controller 38 may then selectively cause the exhaust temperatures to rise through a combination of the different methods described above.

The combination of different methods used by controller 38 to artificially increase exhaust temperatures may be selected based on a user-defined goal. For example, one particular user of power unit 10 may desire the regeneration process to be implemented as efficiently as possible, while another user may desire the regeneration process to be implemented as quickly as possible or at a time that is of least inconvenience. Regardless of the goal, controller 38 may be configured to selectively implement a combination of different temperature-elevating methods that best achieves the goal.

For example, when controller 38 determines a need to heat aftertreatment component(s) 32, controller 38 may determine a mechanical load increase that should be placed on engine 12 to raise a temperature of exhaust exiting engine 12. Controller 38 may then determine an amount of electrical power that should be applied to the resistive grid of heater 34 to directly raise the temperature of the exhaust. Controller 38 may then selectively implement a combination of the engine load increase and application of electrical power to the resistive grid to raise the temperature of exhaust to the threshold temperature of the aftertreatment component(s) 32 in the most efficient manner. In some applications, the majority of the power required to sufficiently increase exhaust temperatures may come from the increased mechanical load placed on engine 12.

During heating of aftertreatment component(s) 32, the electrical power directed to heater 34 may come from different sources. For example, if regeneration is required at the same time that traction motors 20 are actively braking the locomotive and generating electrical power, then the electrical power directed to heater 34 may come primarily from traction motors 20. Any excess power generated by traction motors 20 at this time may be directed in parallel to resistive grids 36, as necessary. However, if regeneration is required at a time when traction motors 20 are not actively braking the locomotive, then the electrical power directed to heater 34 must come from another source, such as from a storage device and/or from primary generator 18.

In general, it may be most efficient to heat the exhaust passing through aftertreatment component(s) 32 with excess electrical power generated by traction motors 20. However, when traction motors 20 are not generating electrical power, it may be most efficient to implement a combination of engine load increase and heater activation (as opposed to only engine load increase or only heater activation). In some embodiments, engine load increase or heater activation alone may not be sufficient to adequately heat aftertreatment component(s) 32.

In some situations, it may be desirable to artificially raise exhaust temperatures via heater 34 whenever excess electrical power is available, regardless of the signals generated by sensor(s) 40. For example, it may be possible that the DPF is not yet fully saturated at a time when traction motors 20 are actively braking the locomotive. In this situation, it may be more efficient to initiate regeneration with the excess electrical power at that time rather than wait for additional soot loading.

It will be apparent to those skilled in the art that various modifications and variations can be made to the exhaust system without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. An exhaust system, comprising:
   an exhaust duct configured to direct exhaust from an engine to the atmosphere;
   an aftertreatment component disposed within the exhaust duct;
   a resistive grid disposed within the exhaust duct at a location upstream of the aftertreatment component;
   an engine; and
   a controller configured to:
   determine a need to heat the aftertreatment component to a threshold temperature;
   determine a load increase that should be placed on the engine to raise a temperature of exhaust exiting the engine when the aftertreatment component needs to be heated;
   determine an amount of electrical power that should be applied to the resistive grid to raise the temperature of the exhaust;
   selectively raise the temperature of exhaust to the threshold temperature using a first combination of engine load increase and application of electrical power to the resistive grid to achieve a first pre-selected goal; and
   selectively raise the temperature of exhaust to the threshold temperature using a second combination of engine load increase and application of electrical power to the resistive grid to achieve a second pre-selected goal, the second combination being different from the first combination;
   wherein the controller determines the engine load increase to raise the temperature of the exhaust independently from determining the application of electrical power to the resistive grid to raise the temperature of the exhaust.

2. The exhaust system of claim 1, wherein the load is placed on the engine via a generator driven by the engine.

3. The exhaust system of claim 2, wherein:
the resistive grid is a first resistive grid;
the exhaust system further includes a second resistive grid not associated with the exhaust duct; and
the controller is further configured to direct excess electrical power produced by the generator during the load increase through the second resistive grid.

4. The exhaust system of claim 2, wherein the electrical power is produced by the generator.

5. The exhaust system of claim 1, wherein:
the aftertreatment component is a particulate filter; and
the threshold temperature is a temperature sufficient to oxidize soot collected within the particulate filter.

6. The exhaust system of claim 1, further including at least one pressure sensor associated with the aftertreatment component, wherein the controller is configured to determine the need to heat the aftertreatment component based on a signal from the at least one pressure sensor.

7. The exhaust system of claim 1, wherein the first pre-selected goal is based on regeneration efficiency.

8. The exhaust system of claim 1, wherein:
the engine drives a generator to produce electrical power directed to a traction motor; and
the electrical power that should be applied to the resistive grid is generated by the traction motor during braking.

9. The exhaust system of claim 8, wherein:
the load is placed on the engine via a generator driven by the engine; and
the electrical power that should be applied to the resistive grid is produced by the generator when the traction motor is not braking.

10. A method of handling exhaust from an engine, comprising:
determining, via a controller having a processor, a need to heat an aftertreatment component to a threshold temperature;
determining, via the controller, a load increase that should be placed on an engine to raise a temperature of exhaust exiting the engine when the aftertreatment component needs to be heated;
determining, via the controller, and independently from the determination of the engine load increase to raise the temperature of the exhaust, an amount of electrical power that should be applied to a resistive grid in a flow path of the exhaust to raise the temperature of the exhaust;
selectively raising the temperature of exhaust to the threshold temperature using a first combination of engine load increase and application of electrical power to the resistive grid to achieve a first pre-selected goal; and
selectively raising the temperature of exhaust to the threshold temperature using a second combination of engine load increase and application of electrical power to the resistive grid to achieve a second pre-selected goal.

11. The method of claim 10, wherein selectively implementing the engine load increase includes selectively causing a generator driven by the engine to consume a greater amount of mechanical power.

12. The method of claim 11, further including directing, via the controller, excess electrical power produced by the generator during the load increase through a resistive grid not associated with the flow path of the exhaust.

13. The method of claim 11, wherein selectively causing the generator to consume a greater amount of mechanical power includes selectively causing the generator to produce the electrical power that should be applied to the resistive grid.

14. The method of claim 10, wherein:
the aftertreatment component is a particulate filter; and
the threshold temperature is a temperature sufficient to oxidize soot collected within the particulate filter.

15. The method of claim 10, further including sensing, via a sensor, a pressure associated with the aftertreatment component, wherein determining the need to heat the aftertreatment component is based on the pressure.

16. The method of claim 10, wherein the first pre-selected goal is based on regeneration efficiency.

17. The method of claim 10, further including:
directing, via the controller, electrical power from a generator driven by the engine to a traction motor; and
selectively, via the controller, directing electrical power produced by the traction motor during braking to the resistive grid.

18. The method of claim 17, wherein:
the load is placed on the engine via a generator driven by the engine; and
the electrical power that should be applied to the resistive grid is produced by the generator when the traction motor is not braking.

19. A power system, comprising:
an engine;
a generator mechanically driven by the engine to generate electrical power;
a traction motor configured to receive the electrical power and propel a machine;
an exhaust duct configured to direct exhaust from the engine to the atmosphere;
a particulate filter disposed within the exhaust duct;
a resistive grid disposed within the exhaust duct at a location upstream of the particulate filter; and
a controller configured to:
determine a need to heat the particulate filter to a light-off temperature of soot trapped in the particulate filter;
determine a load increase that should be placed on the engine to raise a temperature of exhaust exiting the engine when the particulate filter needs to be heated;
determine an amount of electrical power that should be applied to the resistive grid to raise the temperature of the exhaust;
selectively raise the temperature of exhaust to the light-off temperature using a first combination of engine load increase and application of electrical power to the resistive grid to achieve a first pre-selected goal; and
selectively raise the temperature of exhaust to the light-off temperature using a second combination of engine load increase and application of electrical power to the resistive grid to achieve a second pre-selected goal, the second combination being different from the first combination;
wherein the electrical power applied to the resistive grid is produced by the traction motor during braking and produced by the generator when the traction motor is not braking; and
wherein the controller determines the engine load increase to raise the temperature of the exhaust independently from determining the application of electrical power to the resistive grid to raise the temperature of the exhaust.

20. The power system of claim 19, wherein the first pre-selected goal is based on regeneration efficiency.

* * * * *